March 6, 1934.  C. E. SWENSON  1,949,500
UNIVERSAL JOINT
Filed March 14, 1931
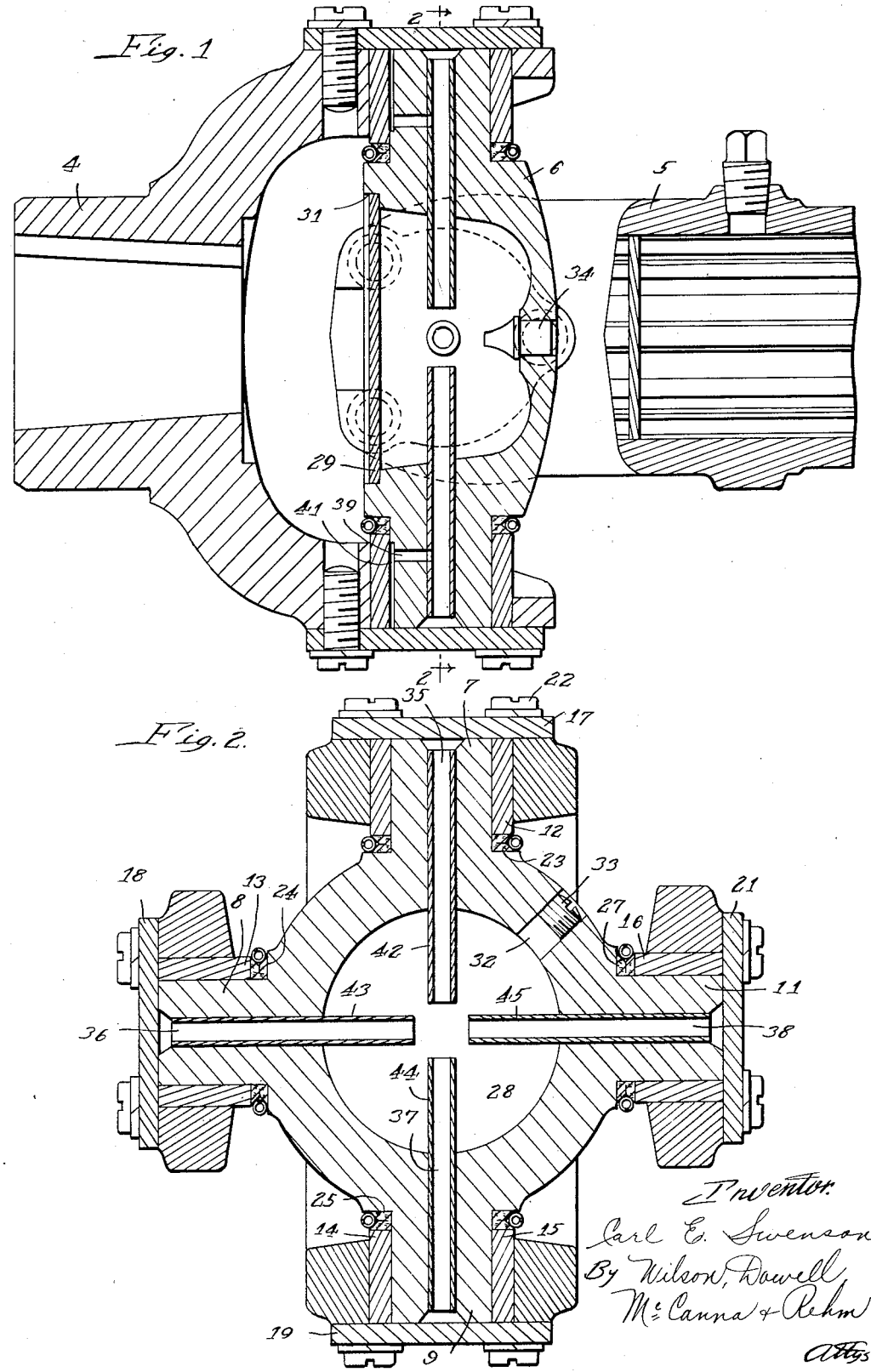

Patented Mar. 6, 1934

1,949,500

UNITED STATES PATENT OFFICE 1,949,500

UNIVERSAL JOINT

Carl E. Swenson, Rockford, Ill., assignor to Mechanics Universal Joint Company, Rockford, Ill., a corporation of Illinois Application March 14, 1931, Serial No. 522,631

3 Claims. (Cl. 64—102)

This invention relates to universal joints of the trunnion type having a reservoir for containing lubricant and means for supplying this lubricant to the bearing surfaces.

The primary purpose of my invention is to improve the construction and design of the lubricant reservoir with the view to reducing the loss of lubricant therefrom from the packing on the trunnions by reducing the fluid pressure on the oil at the bearing surfaces, and by limiting the amount of lubricant which may escape at the bearing surfaces during any one period of rotation of the joint.

Other objects and attendant advantages will be appreciated by those skilled in the art from the following description and the accompanying drawing in which—

Figure 1 is a longitudinal section through a universal joint showing my invention; and Fig. 2 is a section on the line 2—2 of Fig. 1.

Inasmuch as my invention relates primarily to the construction and design of the lubricant reservoir, I have deemed it unnecessary to describe in detail the other parts of the joint. It will suffice to say, that the joint shown in the drawing is of the trunnion type and comprises, generally stated, a pair of terminal coupling members at present in the form of yokes 4 and 5, connected by a transmission member 6, known as a center-cross, having quarteringly arranged trunnions 7, 8, 9 and 11. The trunnions are supported in the terminal coupling members by means of cylindrical bearing members 12, 13, 14, 15 and 16 which are fixedly secured to end plates 17, 18, 19 and 21, the latter being secured to the terminal coupling members by means of stud bolts 22. Packing rings 23, 24, 25, and 27 of identical construction, are positioned on the trunnions between the inner ends of the bearing members and the center-cross 6 to prevent lubricant from escaping from the bearing surfaces between the trunnions and the bearing members and being thrown out of the joint by rotation thereof.

A lubricant chamber 28, is cylindrically formed in the center-cross 6, the open end thereof being conveniently sealed by means of a plate 29 having a press fit within the groove 31. An opening 32 having a threaded plug 33 therein serves to permit the container 28 to be substantially filled with lubricant, an air valve 34 venting the air from the reservoir during the filling operation, thereby eliminating the danger of disarranging the packing during this operation.

Lubricating channels 35, 36, 37, and 38 are axially positioned in the trunnions and extend from the reservoir 28 to the end plates. Channels 39 lead from each of the channels 35, 36, 37 and 38 to the radial bearing surfaces and connect with slots 41, extending lengthwise of the trunnions to supply lubricant to these radial bearing surfaces.

According to my invention tubes 42, 43, 44, and 45, are positioned in the channels 35, 36, 37 and 38, and extend into the reservoir 28 to points near the center of rotation thereof. The function of these tubes is to prevent direct movement of the lubricant from the reservoir 28 through the lubricating channels. It will be seen that when the reservoir 28 is first filled with lubricant, rotation of the joint will permit the first portion of this lubricant to move out through the lubricating channels. However, as the lubricant is consumed at the bearing surfaces or dissipated through the packing rings the level of lubricant in the reservoir will be lowered. Under these circumstances the lubricant will be thrown to the outer walls of the reservoir during the rotation of the joint leaving a central cylinder of air. When the level of the lubricant in the reservoir becomes sufficiently low the ends of the tubes will project into this cylinder of air at the center during the rotation of the joint, whereby the lubricant in the reservoir will exert no centrifugal force on the lubricant in the tubes during the rotation of the joint. Furthermore, when the joint is stopped the lubricant in one or more of the channels will drain back into the reservoir. When the joint is again rotated the tubes which drain will contain little or no lubricant and consequently the pressure on the packing rings of that particular trunnion will be very small, thus reducing the tendency for leakage.

The greatest economy in lubricant is had, however, when the supply thereof in the reservoir 28 becomes low. For example, consider the condition when the joint stops in the position shown in Fig. 2, and the lubricant in the reservoir is insufficient to flow directly into the upper end of the tube 44. Under these circumstances the tubes 42, 43 and 45 are free of lubricant except for the amount naturally clinging to the walls and surfaces thereof. Doubtless, a certain amount of lubricant will have dripped from the tube 42 into the tube 44 partially filling the latter. The joint now is rotated in the manner customary in its use. As this occurs the lubricant in the reservoir 28 is disposed along the outer walls of the reservoir, in which condition it is incapable of entering the lubricating channels or in any way exerting a force thereon due to the rotation of the joint. However, a certain small amount of lubricant will have splashed into each of the tubes at the start of rotation, and this amount will be sufficient to satisfactorily lubricate the bearing surfaces without exerting a substantial pressure against the packing rings. When the joint next stops it is probable that the tube 44 will be in a position to drain, while one of the other tubes will occupy a lower position and thereby receive slightly more lubricant than the other three tubes.

A further advantage of my improved construction lies in the fact that should failure of one or more of the packing rings occur, so that lubricant would be permitted to pass therethrough, it will be impossible for all of the lubricant in the reservoir 28 to be lost during a single period of rotation. After the level of lubricant in the reservoir has reached a point where the tubes project through the outer layer of oil during the rotation of the joint, the maximum amount of lubricant which could be lost during a single period of rotation is the amount contained in the tube in question.

One of the principal advantages of my improved construction lies in the fact that as the amount of lubricant in the reservoir decreases the efficiency with which it is used increases whereby lubricant is maintained in the joint during a substantially longer period than has heretofore been possible.

It is believed that the foregoing conveys a clear understanding of the invention and while I have illustrated but a single working embodiment it should be understood that many changes might be made in the details of construction in the application of my improvements different from the particular embodiment disclosed herein, without departing from the spirit and scope of the invention as expressed in the appended claims in which—

I claim:

1. In an universal joint of the trunnion type, a center-cross having a centrally disposed reservoir coaxial with the axis of rotation of the joint for fluid lubricant and lubricating channels leading therefrom to the bearing surfaces, and tube means at the junction of the channels and the reservoir extending from the periphery of said reservoir to points near the center thereof, said means terminating substantially at the center of the reservoir, whereby upon rotation of the joint the lubricant will be disposed substantially uniformly along the walls of the reservoir and below the entrance to the channels.

2. In a universal joint of the trunnion type, a center-cross having a large capacity cylindrical reservoir for lubricant, the longitudinal axis of the reservoir substantially coinciding with the axis of rotation of the joint, trunnions on said center-cross each having a channel between a bearing surface thereof and said reservoir, and a tube positioned in each of said channels and extending inwardly from the periphery of the reservoir and terminating at a point near the center of rotation of said reservoir, whereby to be disposed beyond the surface of the lubricant when the latter is drawn outward along the wall of the reservoir by the rotation thereof to provide a storage space for the main body of lubricant along the wall of the chamber and outside the entrance to the channels.

3. In a universal joint of the trunnion type, a center-cross having a centrally disposed reservoir for fluid lubricant, the longitudinal axis of the reservoir substantially coinciding with the axis of rotation of the joint, and lubricating channels leading therefrom to bearing surfaces, and tubular members extending inwardly from said channels and from the periphery of said reservoir to points near the axis of rotation and beyond the surface of the lubricant when the latter is drawn outward along the wall of said reservoir by the rotation thereof, whereby upon rotation of the joint said lubricant is substantially uniformly distributed along the walls of the reservoir beyond the entrance to said channels and normally out of direct communication thereto and the main body of lubricant is normally prevented from entering the channels and exerting a centrifugal force against the lubricant in said channels, to prevent loss of lubricant along said bearing surfaces.

CARL E. SWENSON.